(12) United States Patent
Koonath

(10) Patent No.: US 12,411,213 B2
(45) Date of Patent: Sep. 9, 2025

(54) SEPARATION OF LIGHT SIGNALS IN A LIDAR SYSTEM

(71) Applicant: SiLC Technologies, Inc., Monrovia, CA (US)

(72) Inventor: Prakash Koonath, La Crescenta, CA (US)

(73) Assignee: SiLC Technologies, Inc., Monrovia, CA (US)

(*) Notice: Subject to any disclaimer, the term of this patent is extended or adjusted under 35 U.S.C. 154(b) by 987 days.

(21) Appl. No.: 17/498,677

(22) Filed: Oct. 11, 2021

(65) Prior Publication Data

US 2023/0116435 A1   Apr. 13, 2023

(51) Int. Cl.
G01C 3/08 (2006.01)
G01S 7/481 (2006.01)
G01S 17/06 (2006.01)
G01S 17/58 (2006.01)

(52) U.S. Cl.
CPC ............ *G01S 7/4812* (2013.01); *G01S 17/06* (2013.01); *G01S 17/58* (2013.01)

(58) Field of Classification Search
CPC ......... G01S 7/4812; G01S 17/06; G01S 17/58
See application file for complete search history.

(56) References Cited

U.S. PATENT DOCUMENTS

| | | | |
|---|---|---|---|
| 4,262,993 A | 4/1981 | Burns et al. | |
| 4,472,020 A | 9/1984 | Evanchuk | |
| 4,523,803 A | 6/1985 | Arao et al. | |
| 4,786,132 A | 11/1988 | Gordon | |
| 4,845,703 A | 7/1989 | Suzuki | |
| 4,914,665 A | 4/1990 | Sorin | |
| 4,955,028 A | 9/1990 | Alferness et al. | |
| 4,987,832 A | 1/1991 | Klink et al. | |
| 4,995,720 A | 2/1991 | Amzajerdian | |
| 5,041,832 A | 8/1991 | Gulczynski | |
| 5,194,906 A | 3/1993 | Kimura et al. | |
| 5,289,252 A | 2/1994 | Nourrcier | |

(Continued)

FOREIGN PATENT DOCUMENTS

| | | |
|---|---|---|
| CN | 1668939 A | 9/2005 |
| CN | 101356450 A | 1/2009 |

(Continued)

OTHER PUBLICATIONS

Doherty, Fiona, International Preliminary Report on Patentability and Written Opinion, PCT/US2022/045289, The International Bureau of WIPO, Apr. 25, 2024.

(Continued)

*Primary Examiner* — Mark Hellner
(74) *Attorney, Agent, or Firm* — Gavrilovich, Dodd & Lindsey LLP

(57) ABSTRACT

A LIDAR system includes a LIDAR chip with a utility waveguide configured to guide an outgoing LIDAR signal and an incoming LIDAR signal. The incoming LIDAR signal includes light from the LIDAR output signal after an object located outside of the LIDAR system reflects the light from the LIDAR output signal. The LIDAR chip also includes a polarizing-beam splitter configured to receive the outgoing LIDAR signal and the incoming LIDAR signal and to separate the incoming LIDAR signal from the outgoing LIDAR signal.

18 Claims, 8 Drawing Sheets

(56) References Cited

U.S. PATENT DOCUMENTS

| | | |
|---|---|---|
| 5,305,412 A | 4/1994 | Paoli |
| 5,323,223 A | 6/1994 | Hayes |
| 5,396,328 A | 3/1995 | Jestel et al. |
| 5,500,910 A | 3/1996 | Boudreau et al. |
| 5,847,816 A | 12/1998 | Zediker et al. |
| 5,889,490 A | 3/1999 | Wachter et al. |
| 5,953,468 A | 9/1999 | Finnila et al. |
| 5,977,538 A | 11/1999 | Unger et al. |
| 5,995,810 A | 11/1999 | Karasawa |
| 6,035,083 A | 3/2000 | Brennan, III et al. |
| 6,040,898 A | 3/2000 | Mrosik et al. |
| 6,108,472 A | 8/2000 | Rickman et al. |
| 6,400,500 B1 | 6/2002 | Tidmarsh et al. |
| 6,480,513 B1 | 11/2002 | Kapany et al. |
| 6,556,759 B2 | 4/2003 | Roberts et al. |
| 6,567,573 B1 | 5/2003 | Domash et al. |
| 6,687,010 B1 | 2/2004 | Horii et al. |
| 6,921,490 B1 | 7/2005 | Qian et al. |
| 6,959,133 B2 | 10/2005 | Vancoill et al. |
| 6,970,621 B1 | 11/2005 | Fried |
| 6,977,502 B1 | 12/2005 | Hertz |
| 7,345,744 B2 | 3/2008 | Halmos et al. |
| 7,375,877 B1 | 5/2008 | Di Teodoro et al. |
| 7,535,390 B2 | 5/2009 | Hsu |
| 7,907,333 B2 | 3/2011 | Coyle |
| 8,165,433 B2 | 4/2012 | Jenkins et al. |
| 8,213,751 B1 | 7/2012 | Ho et al. |
| 8,311,374 B2 | 11/2012 | Hochberg et al. |
| 8,326,100 B2 | 12/2012 | Chen et al. |
| 8,410,566 B2 | 4/2013 | Qian et al. |
| 8,541,744 B1 | 9/2013 | Liu |
| 8,558,993 B2 | 10/2013 | Newbury et al. |
| 8,885,678 B1 | 11/2014 | Kupershmidt |
| 9,157,790 B2 | 10/2015 | Shpunt et al. |
| 9,176,282 B2 | 11/2015 | Pottier et al. |
| 9,217,831 B1 | 12/2015 | Asghari |
| 9,235,097 B2 | 1/2016 | Meade et al. |
| 9,310,471 B2 | 4/2016 | Sayyah et al. |
| 9,310,487 B2 | 4/2016 | Sakimura et al. |
| 9,519,052 B2 | 12/2016 | Gusev |
| 9,575,341 B2 | 2/2017 | Heck et al. |
| 9,606,234 B2 | 3/2017 | Major, Jr. et al. |
| 9,625,580 B2 | 4/2017 | Kotelnikov et al. |
| 9,735,885 B1 | 8/2017 | Sayyah et al. |
| 9,740,079 B1 | 8/2017 | Davids et al. |
| 9,748,726 B1 | 8/2017 | Morton et al. |
| 9,753,351 B2 | 9/2017 | Eldada |
| 9,778,363 B2 | 10/2017 | Kadambi et al. |
| 9,798,166 B1 | 10/2017 | Sharma et al. |
| 9,823,118 B2 | 11/2017 | Doylend et al. |
| 9,841,495 B2 | 12/2017 | Campbell et al. |
| 9,851,443 B2 | 12/2017 | Chen |
| 9,857,468 B1 | 1/2018 | Eichenholz et al. |
| 9,893,737 B1 | 2/2018 | Keramat et al. |
| 10,003,168 B1 | 6/2018 | Villeneuve |
| 10,007,060 B1 | 6/2018 | Qian et al. |
| 10,094,916 B1 | 10/2018 | Droz et al. |
| 10,137,903 B2 | 11/2018 | Tascione et al. |
| 10,222,474 B1 | 3/2019 | Raring et al. |
| 10,274,599 B2 | 4/2019 | Schmalenberg |
| 10,281,322 B2 | 5/2019 | Doylend et al. |
| 10,345,447 B1 | 7/2019 | Hicks |
| 10,345,497 B2 | 7/2019 | Wu et al. |
| 10,397,019 B2 | 8/2019 | Hartung et al. |
| 10,564,268 B2 | 2/2020 | Turbide et al. |
| 10,605,901 B2 | 3/2020 | Lee et al. |
| 10,627,496 B2 | 4/2020 | Schmalenberg et al. |
| 10,739,256 B1 | 8/2020 | Rickman et al. |
| 10,761,195 B2 | 9/2020 | Donovan |
| 10,782,782 B1 | 9/2020 | DeSalvo et al. |
| 10,788,582 B2 | 9/2020 | Feng et al. |
| 10,816,649 B1 | 10/2020 | Keyser et al. |
| 10,845,480 B1 | 11/2020 | Shah et al. |
| 10,901,074 B1 | 1/2021 | Pan et al. |
| 10,962,713 B2 | 3/2021 | Lee |
| 11,022,683 B1 | 6/2021 | Rezk |
| 11,067,668 B1 | 7/2021 | Bravo |
| 11,114,815 B1 | 9/2021 | Chen et al. |
| 11,119,219 B1 | 9/2021 | LaChapelle et al. |
| 11,162,789 B2 | 11/2021 | Lodin et al. |
| 11,170,476 B1 | 11/2021 | Toshniwal et al. |
| 11,175,388 B1 | 11/2021 | Wood et al. |
| 11,221,404 B1 | 1/2022 | DeSalvo et al. |
| 11,300,683 B2 | 4/2022 | Bao et al. |
| 11,378,691 B2 | 7/2022 | Boloorian et al. |
| 11,448,729 B2 | 9/2022 | Baba et al. |
| 11,454,724 B2 | 9/2022 | Michaels et al. |
| 11,486,975 B1 | 11/2022 | Xiao |
| 11,493,753 B1 | 11/2022 | Wood et al. |
| 11,525,916 B2 * | 12/2022 | Avci ..................... G01S 17/34 |
| 11,536,805 B2 | 12/2022 | Asghari et al. |
| 11,579,300 B1 | 2/2023 | Li |
| 11,635,491 B2 | 4/2023 | Asghari et al. |
| 11,714,167 B2 | 8/2023 | Feng et al. |
| 11,815,720 B1 | 11/2023 | Tavallaee et al. |
| 11,908,075 B2 | 2/2024 | Gorantla |
| 2002/0031304 A1 | 3/2002 | Roberts et al. |
| 2002/0105632 A1 | 8/2002 | Holton |
| 2002/0122398 A1 | 9/2002 | Jou |
| 2002/0159700 A1 | 10/2002 | Coroy et al. |
| 2003/0030582 A1 | 2/2003 | Vickers |
| 2003/0031407 A1 | 2/2003 | Weisberg et al. |
| 2003/0142943 A1 | 7/2003 | Yegnanarayanan et al. |
| 2003/0212520 A1 | 11/2003 | Campos et al. |
| 2003/0231686 A1 | 12/2003 | Liu |
| 2004/0081388 A1 | 4/2004 | Koyama |
| 2004/0085612 A1 | 5/2004 | Livingston et al. |
| 2004/0233964 A1 | 11/2004 | Yamanaka et al. |
| 2004/0249561 A1 | 12/2004 | Capozzi et al. |
| 2005/0123227 A1 | 6/2005 | Vonsovici et al. |
| 2005/0135730 A1 | 6/2005 | Welch et al. |
| 2005/0213103 A1 | 9/2005 | Everett et al. |
| 2005/0219068 A1 | 10/2005 | Jones et al. |
| 2005/0237617 A1 | 10/2005 | Carr et al. |
| 2005/0244103 A1 | 11/2005 | Kwakernaak |
| 2006/0114447 A1 | 6/2006 | Harris et al. |
| 2007/0024849 A1 | 2/2007 | Carrig et al. |
| 2007/0024956 A1 | 2/2007 | Coyle |
| 2007/0036486 A1 | 2/2007 | Miyadera et al. |
| 2007/0103362 A1 | 5/2007 | Arikan et al. |
| 2007/0171407 A1 | 7/2007 | Cole et al. |
| 2007/0223856 A1 | 9/2007 | Nunoya et al. |
| 2008/0088184 A1 | 4/2008 | Tung et al. |
| 2008/0123170 A1 | 5/2008 | Reichert et al. |
| 2008/0174461 A1 | 7/2008 | Hsu |
| 2008/0176681 A1 | 7/2008 | Donahoe |
| 2008/0181550 A1 | 7/2008 | Earnshaw |
| 2008/0205461 A1 | 8/2008 | Henrichs |
| 2009/0046746 A1 | 2/2009 | Munroe et al. |
| 2009/0128797 A1 | 5/2009 | Walsh |
| 2009/0195769 A1 | 8/2009 | Luo et al. |
| 2009/0279070 A1 | 11/2009 | Ueno |
| 2010/0027379 A1 | 2/2010 | Saulnier et al. |
| 2010/0085992 A1 | 4/2010 | Rakuljic et al. |
| 2010/0159858 A1 | 6/2010 | Dent et al. |
| 2010/0187442 A1 | 7/2010 | Hochberg et al. |
| 2010/0271614 A1 | 10/2010 | Albuquerque et al. |
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0068426 A1 | 3/2011 | Zheng et al. |
| 2011/0091155 A1 | 4/2011 | Yilmaz et al. |
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |

(56) References Cited

U.S. PATENT DOCUMENTS

| | | |
|---|---|---|
| 2012/0182544 A1 | 7/2012 | Asahara et al. |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0094074 A1 | 4/2013 | Asghari et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0133864 A1 | 5/2014 | Asghari et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0269790 A1 | 9/2014 | Sebastian et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallesasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0003805 A1 | 1/2018 | Popovich et al. |
| 2018/0024232 A1 | 1/2018 | Gilliland et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0331493 A1 | 11/2018 | Lin et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018197 A1 | 1/2019 | Boutami et al. |
| 2019/0025094 A1 | 1/2019 | Lewis et al. |
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Hallstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0146087 A1 | 5/2019 | Mansur et al. |
| 2019/0146164 A1 | 5/2019 | Krichevsky |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |
| 2019/0204419 A1 | 7/2019 | Baba et al. |
| 2019/0204441 A1 | 7/2019 | Feneyrou et al. |
| 2019/0204443 A1 | 7/2019 | Yao et al. |

(56) References Cited

U.S. PATENT DOCUMENTS

| | | |
|---|---|---|
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0302268 A1 | 10/2019 | Singer et al. |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1 | 12/2019 | Nicolaescu |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Aghari et al. |
| 2020/0116842 A1 | 4/2020 | Aghari et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182973 A1 | 6/2020 | Luff et al. |
| 2020/0182978 A1 | 6/2020 | Maleki et al. |
| 2020/0200879 A1 | 6/2020 | Hallstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1* | 9/2020 | Asghari ................ G01S 7/4818 |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1* | 9/2020 | Behzadi .................. G01S 17/34 |
| 2020/0301070 A1* | 9/2020 | Nagarajan .......... H04B 10/5053 |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1 | 10/2020 | Hiratani |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132232 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Yan et al. |
| 2021/0278540 A1 | 9/2021 | Maayan et al. |
| 2021/0293923 A1 | 9/2021 | Arkind et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0373162 A1 | 12/2021 | Wu et al. |
| 2021/0389244 A1 | 12/2021 | Bowman et al. |
| 2021/0396879 A1 | 12/2021 | Sun et al. |
| 2021/0405194 A1 | 12/2021 | Tsuchida |
| 2022/0003842 A1 | 1/2022 | Wang et al. |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |
| 2022/0107411 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0283389 A1 | 9/2022 | Yang et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0365214 A1 | 11/2022 | Sandborn et al. |
| 2022/0373667 A1 | 11/2022 | Khatana et al. |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0194952 A1 | 6/2023 | Muranaka et al. |
| 2023/0228878 A1 | 7/2023 | Asghari et al. |
| 2023/0258861 A1 | 8/2023 | Vercruysse et al. |
| 2023/0288566 A1 | 9/2023 | Nadkarni et al. |

(56) References Cited

U.S. PATENT DOCUMENTS

| | | |
|---|---|---|
| 2023/0296732 A1 | 9/2023 | Xiao |
| 2025/0085401 A1 | 3/2025 | Zhou et al. |
| 2025/0094380 A1 | 3/2025 | Mazed |

FOREIGN PATENT DOCUMENTS

| | | |
|---|---|---|
| CN | 103874945 A | 6/2014 |
| CN | 104459881 A | 3/2015 |
| CN | 204479750 U | 7/2015 |
| CN | 105589074 A | 5/2016 |
| CN | 105680320 A | 6/2016 |
| CN | 105917257 A | 8/2016 |
| CN | 106154248 A | 11/2016 |
| CN | 106410607 A | 2/2017 |
| CN | 106773028 A | 5/2017 |
| CN | 106842232 A | 6/2017 |
| CN | 106959439 A | 7/2017 |
| CN | 107144847 A | 9/2017 |
| CN | 107305184 A | 10/2017 |
| CN | 107367734 A | 11/2017 |
| CN | 107976666 A | 5/2018 |
| CN | 108139465 A | 6/2018 |
| CN | 108291970 A | 7/2018 |
| CN | 108603758 A | 9/2018 |
| CN | 109642952 A | 4/2019 |
| CN | 110036276 A | 7/2019 |
| CN | 107192355 B | 8/2019 |
| CN | 110161516 A | 8/2019 |
| CN | 110187350 A | 8/2019 |
| CN | 110412685 A | 11/2019 |
| CN | 111338025 A | 6/2020 |
| CN | 112241014 A | 1/2021 |
| CN | 114419152 A | 4/2022 |
| DE | 10 2015 222061 A1 | 5/2017 |
| DE | 10 2017 200795 A1 | 7/2018 |
| DE | 10 2017 106 226 A1 | 9/2018 |
| DE | 102019124598 A1 | 3/2020 |
| EP | 5233921 A1 * | 1/1993 ............... H04J 14/06 |
| EP | 2796890 A1 | 10/2014 |
| EP | 2955542 B1 | 4/2017 |
| EP | 3276371 A1 | 1/2018 |
| EP | 3339924 A1 | 6/2018 |
| EP | 3259615 B1 | 11/2019 |
| EP | 3 584 893 A1 | 6/2021 |
| EP | 3889644 A1 | 10/2021 |
| GB | 1 585 053 A | 2/1981 |
| GB | 2173664 A | 10/1986 |
| JP | H1010227 A | 1/1998 |
| JP | 2003224321 A | 8/2003 |
| JP | 2004-151022 A | 5/2004 |
| JP | 2007184511 A | 7/2007 |
| JP | 2008160130 A | 7/2008 |
| JP | 2008292370 A | 12/2008 |
| JP | 2009-115696 A | 5/2009 |
| JP | 2010151806 A | 7/2010 |
| JP | 2010271624 A | 12/2010 |
| JP | 2021004800 A | 1/2011 |
| JP | 2012146787 A | 8/2012 |
| JP | 2013165407 A | 8/2013 |
| JP | 2014202716 A | 10/2014 |
| JP | 2015-018640 A | 1/2015 |
| JP | 2015092184 A | 5/2015 |
| JP | 2015172540 A | 10/2015 |
| JP | 2015180735 A | 10/2015 |
| JP | 2015230259 A | 12/2015 |
| JP | 2016111087 A | 6/2016 |
| JP | 2016-525209 A | 8/2016 |
| JP | 5975203 B2 | 8/2016 |
| JP | 2017502315 A | 1/2017 |
| JP | 2017097340 A | 6/2017 |
| JP | 2017106897 A | 6/2017 |
| JP | 2017524918 A | 8/2017 |
| JP | 2017161484 A | 9/2017 |
| JP | 2017-198514 A | 11/2017 |
| JP | 2017-211348 A | 11/2017 |
| JP | 2018511054 A | 4/2018 |
| JP | 2018-512600 A | 5/2018 |
| JP | 2018520346 A | 7/2018 |
| JP | 2018529955 A | 10/2018 |
| JP | 2018188284 A | 11/2018 |
| JP | 2018200273 A | 12/2018 |
| JP | 2019502925 A | 1/2019 |
| JP | 2019095218 A | 6/2019 |
| JP | 2019525195 A | 9/2019 |
| JP | 2019-537012 A | 12/2019 |
| JP | 2020-16639 A | 1/2020 |
| JP | 2020-34546 A | 3/2020 |
| JP | 2002090457 A | 3/2020 |
| JP | 2020085723 A | 6/2020 |
| JP | 2021032848 A | 3/2021 |
| JP | 7397009 A | 12/2023 |
| KR | 20060086182 A | 7/2006 |
| KR | 10-2015-0045735 A | 4/2015 |
| KR | 20180013598 A | 2/2018 |
| KR | 101 931 022 B1 | 12/2018 |
| WO | 97/11396 A1 | 3/1997 |
| WO | 2010123182 A1 | 10/2010 |
| WO | 2010127151 A1 | 11/2010 |
| WO | 2012123668 A1 | 9/2012 |
| WO | 2012153309 A2 | 11/2012 |
| WO | 2013/049579 A1 | 4/2013 |
| WO | 2014/203654 A1 | 12/2014 |
| WO | 2014/206630 A1 | 12/2014 |
| WO | 2015/044370 A1 | 4/2015 |
| WO | 2015/058209 A1 | 4/2015 |
| WO | 2015/098027 A1 | 7/2015 |
| WO | 2015/200800 A1 | 12/2015 |
| WO | 2016/097409 A2 | 6/2016 |
| WO | 2017/023107 A1 | 2/2017 |
| WO | 2017/083597 A1 | 5/2017 |
| WO | 2017/095817 A1 | 6/2017 |
| WO | 2017/102156 A1 | 6/2017 |
| WO | 2017/187510 A1 | 11/2017 |
| WO | 2017/216581 A1 | 12/2017 |
| WO | 2018/003852 A1 | 1/2018 |
| WO | 2018/036946 A1 | 3/2018 |
| WO | 2018/060318 A1 | 4/2018 |
| WO | 2018/116412 A1 | 6/2018 |
| WO | 2018/160240 A2 | 9/2018 |
| WO | 2018/230474 A1 | 12/2018 |
| WO | 2019/010320 A1 | 1/2019 |
| WO | 2019/018894 A1 | 1/2019 |
| WO | 2019/121069 A1 | 6/2019 |
| WO | 2019/130472 A1 | 7/2019 |
| WO | 2019/149815 A1 | 8/2019 |
| WO | 2019/196135 A1 | 10/2019 |
| WO | 2019/217761 A1 | 11/2019 |
| WO | 2019/217857 A1 | 11/2019 |
| WO | 2019/236430 A1 | 12/2019 |
| WO | 2019/236464 A1 | 12/2019 |
| WO | 2020/005537 A1 | 1/2020 |
| WO | 2020/033161 A1 | 2/2020 |
| WO | 2020/046513 A1 | 3/2020 |
| WO | 2020/076566 A1 | 4/2020 |
| WO | 2020/110779 A1 | 6/2020 |
| WO | 2020/129284 A1 | 6/2020 |
| WO | 2020/234797 A1 | 11/2020 |
| WO | 2020/251633 A1 | 12/2020 |
| WO | 2021/024038 A1 | 2/2021 |
| WO | 2021/252894 A1 | 12/2021 |
| WO | 2022/013422 A1 | 1/2022 |
| WO | 2022/233503 A1 | 11/2022 |
| WO | 2023/118295 A1 | 6/2023 |

OTHER PUBLICATIONS

Rodriquez, Kari, International Search Report and Written Opinion, PCT/US2022/045289, The International Searching Authority, United States Patent and Trademark Office, Apr. 14, 2023.

"The Demultiplexer" accessed from www.electronics-tutorials.ws/combination/comb_3.html with WayBack Machine dated Feb. 9, 2008, 2 pages.

(56) References Cited

OTHER PUBLICATIONS

Van Acoleyen et al., "Off-chip beam steering with a one-dimensional optical phased array on silicon-on-insulator", Apr. 2009, Opt. Lett., 34(9) 1477-1479.
Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.
Vasilyev, A. et al., "The Optoelectronic Swept-Frequency Laser and Its Applications in Ranging, Three-Dimensional Imaging, and Coherent Beam Combining of Chirped-Seed Amplifiers," CaltechThesis, May 20, 2013, 177 pages.
Velodyne, "HDL-64E S2 Datasheet. Retrieved from http://velodynelidar.com/lidar/products/brochure/HDL-64E%20S2%20datasheet_2010_lowres.pdf", 2017.
Wang et al., "Automotive FMCW Radar-enhanced Range Estimation via a Local Resampling Fourier Transform", International Journal of Advanced Robotic Systems, May 15, 2016, pp. 1-8.
Wikipedia, Optical Attenuator, 2022, 3 pages.
Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.
Wojtkiewicz et al., "Two-dimensional signal processing in FMCW radars", National Conference on Circuit Theory and Electronic Networks, vol. 2, Oct. 1997, pp. 1-6.
Zhu et al., "Dual-Comb Ranging", Engineering, 4, Oct. 16, 2018, pp. 772-778.
Aalto, Timo et al., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.
Anderson et al., "ladar: Frequency-Modulated Continuous Wave Laser Detection and Ranging", Photogrammetric Engineering & Remote Sensing, vol. 83, No. 11, Nov. 2017.
Baghmisheh, B. B., "Chip-scale Lidar", Jan. 19, 2017, Electrical Engineering and Computer Sciences University of California, Berkeley.
Behroozpour et al., "Electronic-Photonic Integrated Circulator 3D Microimaging", IEEE Journal of Solid-State Circuits, Jan. 2017, vol. 52, No. 1, pp. 161-172.
Behroozpour, B. et al., "Lidar System Architectures and Circuits," IEEE Communications Magazine, Oct. 2017, pp. 135-142.
Carter et al., "Lidar 101: An Introduction to Lidar Technology, Data, and Applications", Nov. 2012, NOAA Coastal Services Center, 76 pages.
Chan, M.K, "Atmospheric transmission windows for high energy short pulse lasers", Thesis, Naval Postgraduate School, Dec. 2003. Conditional Euclidean Clustering, retrieved on Jul. 9, 2022 from https://pcl.readthedocs.io/projects/tutorials/en/latest/cluster_extraction.html#cluster-extraction.
Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.
Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.
Doylend, J. K., "Two-dimensional free-space beam steering with an optical phased array on silicon-on-insulator", Oct. 1, 2011, Optics Express, 19(22), 21595-2160.
Euclidean Cluster Extraction, retrieved on Jul. 9, 2022 from https://pcl.readthedocs.io/projects/tutorials/en/latest/conditional_euclidean_clustering.html.
Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.
Goodman, J., "Speckle Phenomena in Optics Theory and Applications", Roberts and Company, Sep. 28, 2007, 130(2), pp. 413-414.
Gulati, et al., "A Low-Power Reconfigurable Analog-to-Digital Converter", IEEE Journal of Solid-State Circuits, Dec. 2001, vol. 36, No. 12, pp. 1900-1911.
Guo et al., "Beat-frequency adjustable Er3+-doped DBR fiber laser for ultrasound detection", Optics Express, Jan. 31, 2011, vol. 19, No. 3, pp. 2485-2492.
Haran, T., "Short-wave infrared diffuse reflectance of Textile Materials", Thesis, Georgia State University, 2008.
Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.
Lu, Z., "Silicon Photonic Switches for Optical Communication Applications", PhD Thesis. University of British Columbia, Sep. 29, 2017, 165 pages.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M. et al., "Multi-Wavelength Airborne Laser Scanning", ILMF 2011. New Orleans, Feb. 7-9, 2011.
PI Motion/Positioning, 2018, Retrieved from PI USA: http://www.pi-usa.us/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pierrottet et al., "Linear FMCW Laser Radar for Precision Range and Vector Velocity Measurements", MRS Online Proceeding Library Archive, Jan. 2008, pp. 1-9.
Pilot Photonics, Lyra OCS 1000, Optical comb laser module, Retrieved on Nov. 20, 2019 from Pilot Photonics: http://www.pilotphotonics.com/optical-frequency-comb-source/.
Poulton, C. V. MSC Thesis, "Integrated LIDAR with Optical Phased Arrays in Silicon Photonics", Massachusetts Institute of Technology, Sep. 2016, pp. 95-101.
Poulton, Christopher V. et al., "Coherent Solid-State LIDAR with Silicon Photonic Optical Phased Arrays", pp. 4091-4094, Oct. 15, 2017, Optics Letters, vol. 42, No. 20.

(56) References Cited

OTHER PUBLICATIONS

Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).

Royo et al., "An Overview of LIDAR Imaging Systems for Autonomous Vehicles", Appl. Sci., Sep. 30, 2019, 9(19):4093, 37 pages. https://doi.org/10.3390/app9194093.

Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254. pdf.

Sandborn, Phillip Alan McGinnis, "FMCW Lidar: Scaling to the Chip-Level and Improving Phase-Noise-Limited Performance", Fall 2017, 18 pages.

Satyan, N. et al., "Precise control of broadband frequency chirps using optoelectronic feedback," Optics Express, Aug. 31, 2009, vol. 17, No. 18, pp. 15991-15999.

Schulmeister, Karl, "White Paper The new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

Nevlacsil et al., "Multi-channel swept source optical coherence tomography concept based on photonic integrated circuits", Optics Express, Oct. 26, 2020, vol. 28, No. 22, pp. 32468-32482.

Reeck, Guido, Search Report, European Patent Office, Application No. 22881562.7, Jun. 13, 2025.

\* cited by examiner

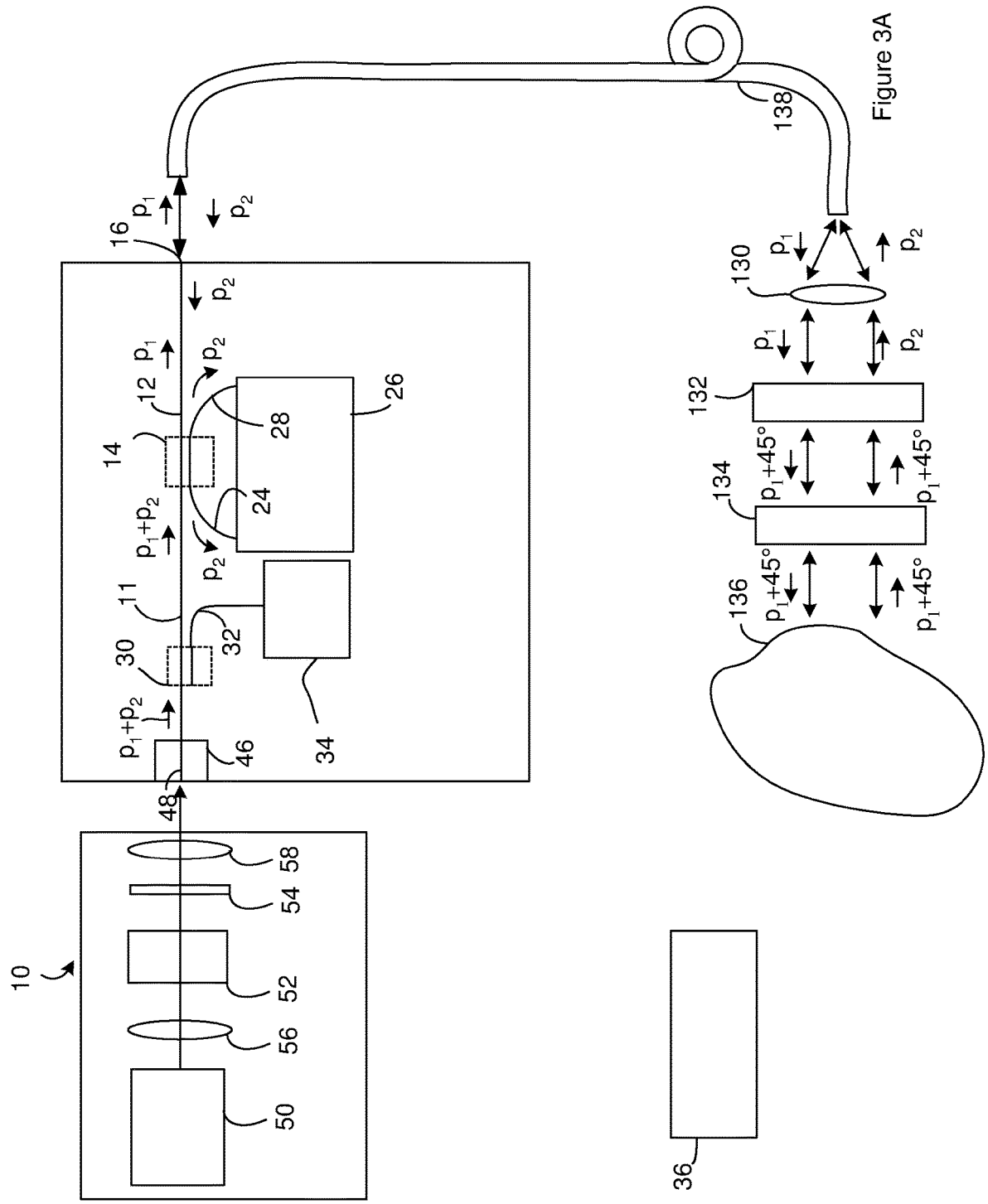

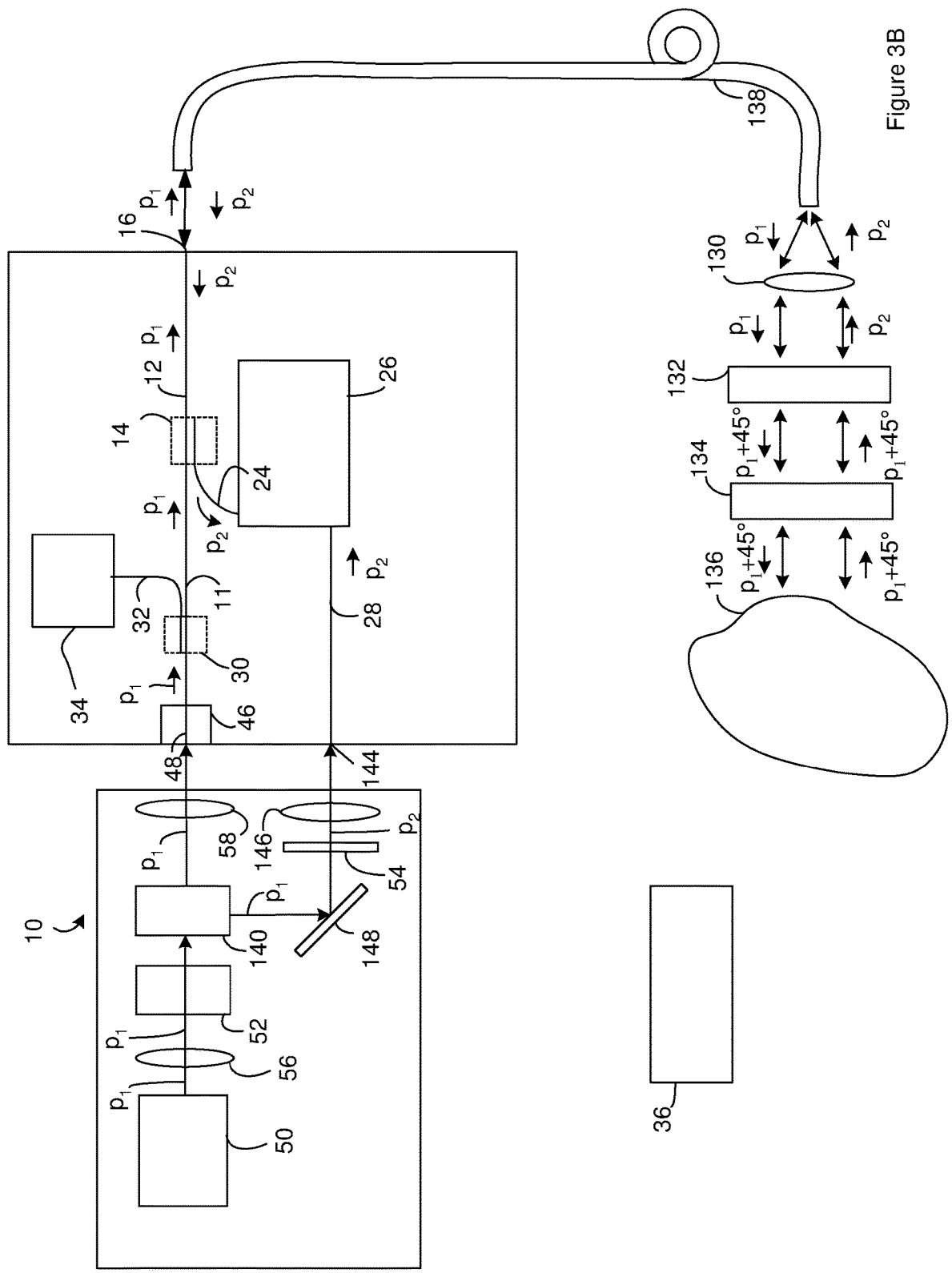

SEPARATION OF LIGHT SIGNALS IN A LIDAR SYSTEM

FIELD

The invention relates to optical devices. In particular, the invention relates to LIDAR systems.

BACKGROUND

LIDAR systems bounce light off objects located outside of the LIDAR system. The LIDAR system uses light that returns to the LIDAR system from the object to calculate LIDAR data that indicates the distance and/or radial velocity between the LIDAR system and the object.

LIDAR systems can often be described as coaxial or biaxial. In coaxial systems, the outgoing light that is to be transmitted from the LIDAR system and the light that returns to the LIDAR system often travel in opposing directions along the same waveguide. However, the returning light needs to be separated from the outgoing light in order to process the returning light. This separation has been achieved with an optical coupler such as a 3 dB coupler. However, the returning light often is at very low power levels because the returning light has been reflected by a variety of different objects that are located outside of the LIDAR system. Because of the low power levels of the returning light, the optical loss associated with the use of optical couplers reduces the reliability of LIDAR data generated from these LIDAR systems. As a result, there is a need for LIDAR systems that produce LIDAR data with increased levels of reliability.

SUMMARY

A LIDAR system includes a LIDAR chip with a utility waveguide configured to guide an outgoing LIDAR signal and an incoming LIDAR signal. The incoming LIDAR signal includes light from the LIDAR output signal after an object located outside of the LIDAR system reflects the light from the LIDAR output signal. The LIDAR chip also includes a polarizing-beam splitter configured to receive the outgoing LIDAR signal and the incoming LIDAR signal and to separate the incoming LIDAR signal from the outgoing LIDAR signal.

Another embodiment of a LIDAR system includes a LIDAR chip with a utility waveguide configured to guide an outgoing LIDAR signal and an incoming LIDAR signal. The incoming LIDAR signal includes light from the LIDAR output signal after an object located outside of the LIDAR system reflects the light from the LIDAR output signal. The LIDAR chip also includes a polarizing-beam splitter configured to couple a portion of the outgoing LIDAR signal from the utility waveguide onto a reference waveguide as a reference signal and to couple a portion of the incoming LIDAR signal from the utility waveguide onto a comparative waveguide as a comparative signal. The LIDAR chip generates a composite signal having light from the reference signal beating with light from the comparative signal. The LIDAR system also includes electronics configured to use the beat frequency of the composite signal as a variable in a calculation of LIDAR data that indicates a distance and/or radial velocity between the LIDAR system and the object.

BRIEF DESCRIPTION OF THE FIGURES

FIG. 3A is a topview of a LIDAR system that includes the LIDAR chip of FIG. 1 and the LIDAR source of FIG. 2.

FIG. 3B is a topview of a LIDAR system.

FIG. 6C is a topview of the system.

FIG. 6D is a cross section of the system shown in FIG. 6C taken through a waveguide on the LIDAR chip and the amplifier waveguide on the amplifier chip.

DESCRIPTION

A LIDAR system includes a polarizing-beam splitter that receives an input light signal from an input waveguide and outputs an outgoing LIDAR signal on a utility waveguide. The outgoing LIDAR signal includes or consists of light from the input signal. The LIDAR system transmits a system output signal that includes or consists of light from the outgoing LIDAR signal. The system output signal can be reflected by an object located outside of the LIDAR system. The reflected portion of the system output signal can serve as a system return signal. The LIDAR system can receive light from the system return signal. Light from the system return signal can be included in an incoming LIDAR signal that the polarizing-beam splitter receives from the utility waveguide. As a result, the utility waveguide carries both the incoming LIDAR signal and the outgoing LIDAR signal in opposing directions. The LIDAR system is configured such that the input light signal is primarily in a first polarization state and the incoming LIDAR signal is primarily in a second polarization state. The first polarization state is different from the second polarization state. The polarizing-beam splitter uses the difference in the polarization states of the input light signal and the incoming LIDAR signal to separate the incoming LIDAR signal from the input signal. The polarizing-beam splitter can output at least a portion of the incoming LIDAR signal on a comparative waveguide. Since the polarization state of the incoming LIDAR signal is used to separate the incoming LIDAR signal from other light signals, the optical loss associated with separation of the incoming LIDAR signal is reduced relative to systems that use a coupler to separate optical signals. Accordingly, the LIDAR system retains more of the incoming LIDAR signal than is retained by prior systems. The increase in the power level retention of the incoming LIDAR signal allows the LIDAR system to generate more reliable LIDAR data.

Figure 1:
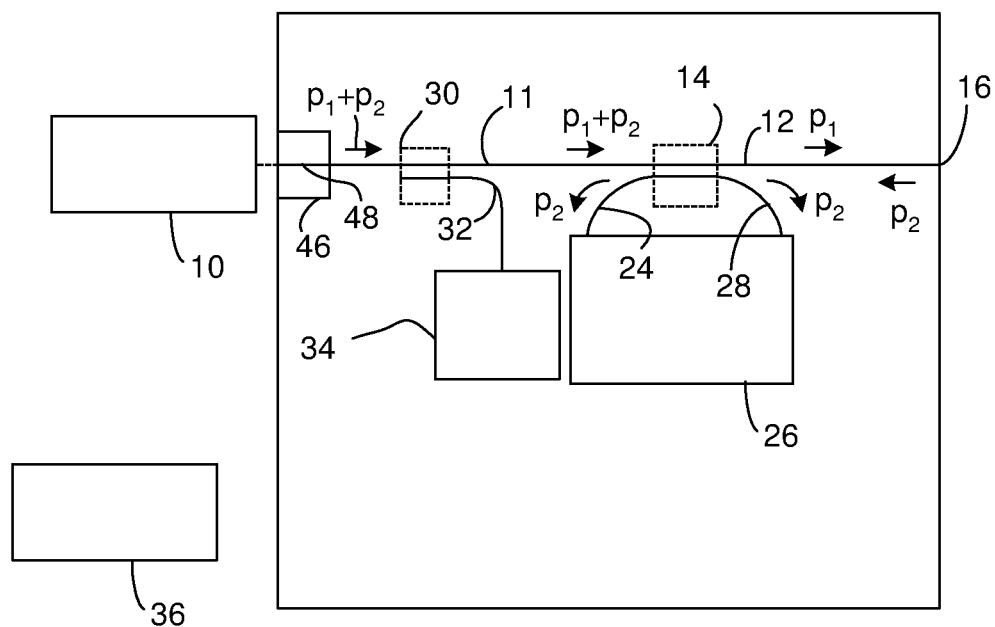
FIG. 1 is a topview of a schematic of a LIDAR chip for use in a LIDAR system.

FIG. 1 is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip.

The LIDAR chip includes an input waveguide 11 that receives a light source signal from a light source 10. The light source 10 is configured such that a first portion of the light source signal has a first polarization state (labeled $p_1$ in FIG. 1) and a second portion of the light source signal has a second polarization state (labeled $p_2$ in FIG. 1). The portion of the light source signal that enters the input waveguide 11 serves as an input signal. As a result, a first portion of the input signal has a first polarization state (labeled $p_1$ in FIG. 1) and a second portion of the input source signal has a second polarization state (labeled $p_2$ in FIG. 1).

The first polarization state and the second polarization state can be linear polarization states and the second polarization state is different from the first polarization state. For instance, the first polarization state can be TE and the second polarization state can be TM or the first polarization state can be TM and the second polarization state can be TE.

The input waveguide 11 carries the input signal to a splitter 14 that receives the input signal. The splitter can be a polarizing beam-splitter. When a polarizing beam-splitter receives an input signal that has light in multiple different polarization states, the polarizing beam-splitter splits the input signal into two different signals that each carries light of a different polarization state. The polarizing beam-splitter directs the different signals to different waveguides that carry the output of the polarizing beam-splitter. As a result, a polarizing beam-splitter directs light to one of multiple different waveguides in response to the polarization state of the light. Accordingly, the splitter 14 outputs on a utility waveguide 12 an outgoing LIDAR signal that includes primarily, consists essentially of, and/or consists of light from the first portion of the input signal. As a result, the light in the outgoing LIDAR signal can include primarily, consist essentially of, and/or consist of light in the first polarization state and, in some instances, can exclude or substantially exclude light in the second polarization state. A suitable polarizing beam-splitter includes, but is not limited to, a polarization splitter such as a 2×2 polarizing beam-splitter.

The utility waveguide 12 terminates at a facet 16 and carries the outgoing LIDAR signal to the facet 16. The facet 16 can be positioned such that the outgoing LIDAR signal traveling through the facet 16 exits the LIDAR chip and serves as a LIDAR output signal. For instance, the facet 16 can be positioned at an edge of the chip so the outgoing LIDAR signal traveling through the facet 16 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

Light from the LIDAR output signal travels away from the LIDAR system in the system output signal. The system output signal can travel through free space in the atmosphere in which the LIDAR system is positioned. The system output signal may be reflected by one or more objects in the path of the system output signal. When the system output signal is reflected, at least a portion of the reflected light travels back toward the LIDAR chip as a system return signal.

Light from the system return signal can be carried in a LIDAR input signal that is received by the LIDAR chip. In some instances, a portion of the system return signal can serve as a LIDAR input signal. The LIDAR input signals enters the utility waveguide 12 through the facet 16 and serves as an incoming LIDAR signal. The utility waveguide 12 carries the incoming LIDAR signal to the splitter 14.

The splitter 14 outputs at least a portion of the incoming LIDAR signal on a comparative waveguide 24 as a comparative signal. As will be described below, the LIDAR input signal includes primarily, consists essentially of, and/or consists of light in the second polarization state and in some instances, can exclude or substantially exclude light in the first polarization state. As a result, the incoming LIDAR signal and the comparative signal can include primarily, consist essentially of, and/or consist of light in the second polarization state and in some instances, can exclude or substantially exclude light in the first polarization state.

The comparative waveguide 24 carries the incoming LIDAR signal to a processing component 26 for further processing. Additionally, the splitter 14 outputs on a reference waveguide 28 a reference signal that includes primarily, consists essentially of, and/or consists of light from the second portion of the input signal. As a result, the light in the reference signal can include primarily, consist essentially of, and/or consist of light in the second polarization state and, in some instances, can exclude or substantially exclude light in the first polarization state. In contrast with the comparative signal, the reference signal includes primarily, consists of, and/or consists essentially of light that has not exited from the LIDAR chip. Since the reference signal and the comparative signal both include light from the input signal, the input signal can serve as a common source signal for the reference signal and the comparative signal.

The reference waveguide 28 carries the reference signal to the processing component 26 for further processing. As a result, the LIDAR system is configured such that the reference signal and the comparative signal received by the processing component 26 each includes primarily, consists essentially of, and/or consists of light in the same polarization state.

The LIDAR chip can include a control branch for controlling operation of the light source 10. The control branch includes a splitter 30 that moves a portion of the light source signal from the input waveguide 11 onto a control waveguide 32. The coupled portion of the light source signal serves as a tapped signal. Although FIG. 1 illustrates a directional coupler operating as the splitter 30, other signal tapping components can be used as the splitter 30. Suitable splitters 30 include, but are not limited to, directional couplers, optical couplers, y-junctions, tapered couplers, and Multi-Mode Interference (MMI) devices.

The control waveguide 32 carries the tapped signal to control component 34. The control component 34 can be in electrical communication with electronics 36. All or a portion of the control component 34 can be included in the electronics 36. During operation, the electronics can employ output from the control component 34 to control a process variable of one, two, three, four, or five controlled light signals selected from the group consisting of the tapped signal, the system output signal, the outgoing LIDAR signal, the system output signal, and the LIDAR output signal. Examples of the suitable process variables include the frequency of the controlled light signal and/or the phase of the controlled light signal. The electronics 36 can use output from the control component 34 in a feedback control loop to control the process variable.

The illustrated LIDAR chip includes an optical amplifier 46 that can be operated by the electronics 36. The optical amplifier includes an amplifier waveguide 48. The light source signal passes through the amplifier waveguide and is amplified before being received at the utility waveguide. The optical amplifier 46 is optional. As a result, the light source signal can be received directly from the light source without being amplified by the amplifier.

Figure 2:
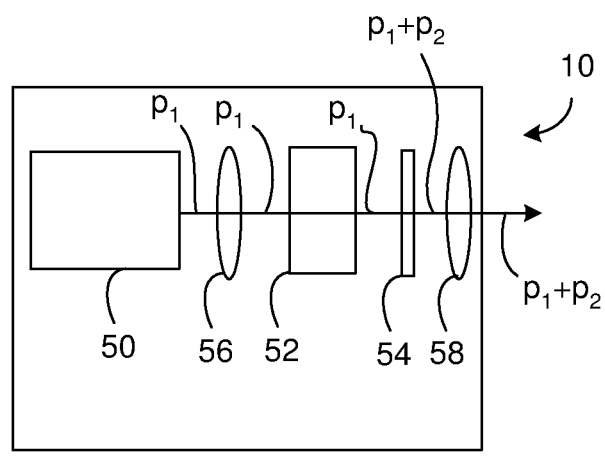
FIG. 2 is a topview of a schematic of a light source that is suitable for use with the LIDAR chip of FIG. 1.

FIG. 2 is a schematic of a suitable light source 10 for use with the LIDAR chip of FIG. 1. The light source 10 includes an optical signal source 50 configured to output a source output signal. A suitable optical signal source 50 includes, but is not limited to a laser source. In some instances, the optical signal source 50 linearly polarized. As a result, the light in the source output signal can include primarily, consist of, and/or consist essentially of light in the first polarization state or light in the second polarization state. In FIG. 1, the source output signal is illustrated as consisting of and/or consisting essentially of light in the first polarization state (labeled $p_1$).

The optical signal source 50 includes one or more isolators 52 configured to receive the source output signal and to output the source output signal. The one or more optical isolators can be configured to stop or substantially stop back-reflected light from reaching the optical signal source 50. Since amplification of light signals processed by the LIDAR system can be a source of back-reflection, the one or more isolators 52 can allow the LIDAR system to have the benefits of amplification without loss in performance of the LIDAR system.

The light source 10 includes a polarization rotator 54 configured to receive the source output signal from the one or more isolators 52 and to output the light source signal. The polarization rotator 54 can be a reciprocal or non-reciprocal polarization rotator. Suitable polarization rotators 54 include, but are not limited to, half-wave plates, rotation of polarization-maintaining fibers, Faraday rotators, MEMs-based polarization rotators and integrated optical polarization rotators using asymmetric y-branches, Mach-Zehnder interferometers and multi-mode interference couplers. When the light in the source output signal is in the first polarization state, the polarization rotator can introduce the second polarization state into the light source signal output from the polarization rotator. Alternately, when the light in the source output signal is in the second polarization state, the polarization rotator can introduce the first polarization state into the light source signal output from the polarization rotator.

Changing the rotation angle of a polarization rotator 54 such as a half-wave plate relative to the source output signal, changes relative amounts of the first polarization state and the second polarization state in the light source signal output. As a result, the rotation angle of the polarization rotator relative to the source output signal can be selected to provide the light source signal output with the desired ratio for the power of light in the first polarization state: the power light in the second polarization state. Suitable ratios for power of light in the first polarization state: power of light in the second polarization state include, but are not limited to, ratios greater than 20:1, 10:1, or 5:1, and/or less than 4:1, 3:1, or 2:1. In some instances, the optical signal source 50 outputs a source output signal that consists of and/or consists essentially of light in the second polarization state and the ratios for power of light in the first polarization state: power of light the second polarization state include, but are not limited to, ratios greater than 20:1, 10:1, or 5:1, and/or less than 4:1, 3:1, or 2:1. In some instances, the optical signal source 50 outputs a source output signal that consists of and/or consists essentially of light in the first polarization state and the ratios for power of light in the first polarization state: power of light the second polarization state include, but are not limited to, ratios greater than 20:1, 10:1, or 5:1, and/or less than 4:1, 3:1, or 2:1.

The light source 10 can optionally include one or more beam-shaping components configured to provide an optical signal with the desired shape. For instance, the light source 10 in FIG. 2 includes a first beam-shaping component 56 that receives the source output signal from the light source 10. The first beam-shaping component 56 can be configured to provide the source output signal with the desired shape. For instance, the first beam-shaping component 56 can be configured to collimate the source output signal such that the source output signal received by the isolator 56 is collimated.

The light source 10 in FIG. 2 includes a second beam-shaping component 58 that receives the light source signal from the polarization rotator 54. The second beam-shaping component 58 can be configured to provide the source output signal with the desired shape. For instance, the second beam-shaping component 58 can be configured to focus the source output signal at a desired location. In one example, the second beam-shaping component 58 is configured to focus the source output signal such that the source output signal is coupled to the input waveguide 11 or the amplifier waveguide 48. For instance, the second beam-shaping component 58 is configured to focus the source output signal at a facet of the input waveguide 11, or at a facet of the amplifier waveguide 48.

When a LIDAR system includes a light source constructed according to FIG. 2, the signal output from the polarization rotator 54 can serve as the light source signal output from the light source 10 and received by the LIDAR chip. As a result, the comparative signal and the reference signal can include primarily, consist of, and/or consists essentially of light from the source output signal. As a result, the source output signal can serve as a common source signal for the reference signal and the comparative signal.

All or a portion of the components of the light source such as the light source 50, the isolator 52, the polarization rotator 54, and the beam-shaping components can be positioned on a base 60. Suitable bases 60 include, but are not limited to, substrates, platforms, desktops and plates. The components can be discrete components that are attached to the base 60. Suitable mechanisms for attaching discrete components to the base 60 include, but are not limited to, epoxy, solder, and mechanical clamping.

As noted above, the LIDAR chip include one or more waveguides that constrains the optical path of one or more light signals. While the light source can optionally include waveguides, the optical path that the signals travel between components on the light source 10 and/or between the LIDAR chip and a component on the light source 10 can be free space. For instance, the signals can travel through the atmosphere in which the LIDAR chip, the light source 10 and/or a LIDAR system that includes the light source 10 is positioned when traveling between the different components on the light source 10.

FIG. 3A illustrates a LIDAR system that includes the LIDAR chip of FIG. 1 and the light source of FIG. 2. The LIDAR system can include one or more system components that are at least partially located off the LIDAR chip. Examples of suitable system components include, but are not limited to, optical links, beam-shaping components, polarization state rotators, beam steering components, optical splitters, optical amplifiers, and optical attenuators. For instance, the LIDAR system of FIG. 3A can include one or more beam-shaping components 130 that receive the LIDAR output signal from the LIDAR chip and outputs a shaped signal. The one or more beam-shaping components 130 can be configured to provide the shaped signal with the desired shape. For instance, the one or more beam-shaping components 130 can be configured to output a shaped signal that is focused, diverging or collimated. In FIG. 3A, the one or more beam-shaping components 130 is a lens that is configured to output a collimated shaped signal.

The LIDAR systems of FIG. 3A includes one or more polarization rotators 132 that receive the shaped signal and outputs a rotated signal. In some instances, the one or more polarization rotators 132 are configured to rotate the polarization state of the shaped signal by n*90°+45° where n is 0 or an even integer. Suitable polarization rotators 132 include, but are not limited to, non-reciprocal polarization rotators such as Faraday rotators.

The LIDAR system of FIG. 3A can optionally include one or more beam steering components 134 that receive the rotated signal from the one or more polarization rotators 132 and that output the system output signal. For instance, 3 illustrates a beam steering component 134 that receive the rotated signal from a polarization rotator 132. The electronics 36 can operate the one or more beam steering component 134 so as to steer the system output signal to different sample regions 135. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Suitable beam steering components include, but are not limited to, movable mirrors, MEMS mirrors, optical phased arrays (OPAs), optical gratings, actuated optical gratings and actuators that move the LIDAR chip.

When the system output signal is reflected by an object 136 located outside of the LIDAR system and the LIDAR, at least a portion of the reflected light returns to the LIDAR system as a system return signal. While the reflection by the object can changes the polarization state of a portion of the light in the system output signal, the polarization state is generally retained. As a result, the light in the system return signal is primarily in the same polarization state as the light in the system output signal.

When the LIDAR system includes one or more beam steering components 134, the one or more beam steering components 134 can receive at least a portion of the system return signal from the object 136. The one or more polarization rotators 132 can receive at least a portion of the system return signal from the object 136 or from the one or more beam steering components 134. The one or more polarization rotators 132 can output a rotated return signal. The one or more beam-shaping components 130 receive the rotated return signal from the one or more polarization rotators 132 and output the LIDAR input signal that is received by the LIDAR chip.

When the one or more polarization rotators 132 are configured to rotate the polarization state of the shaped signal by n*90°+45° where n is 0 or an even integer, when the one or more polarization rotators 132 are non-reciprocal, the one or more polarization rotators 132 also rotate the polarization state of the system return signal such that the polarization state of the rotated return signal is rotated by n*90°−45° relative to the polarization state of the system return signal. As a result, the polarization state of the rotated return signal is changed by n*180°+90° (where n is 0 or an even integer) relative to the polarization state of the shaped signal. Accordingly, the polarization state of the LIDAR input signal is increased by n*180°+90° (where n is 0 or an even integer) relative to the polarization state of the LIDAR output signal. For instance, when the LIDAR output signal includes primarily, consists essentially of, and/or consists of light in the first polarization state, the LIDAR input signal includes primarily, consists essentially of, and/or consists of light in the second polarization state and in some instances, can exclude or substantially exclude light in the first polarization state. Alternately, when the LIDAR output signal includes primarily, consists essentially of, and/or consists of light in the second polarization state, the LIDAR input signal includes primarily, consists essentially of, or consists of light in the first polarization state.

The LIDAR system of FIG. 3A include an optional optical link 138 that carries optical signals to the one or more system components from the LIDAR chip. For instance, the LIDAR system of FIG. 3A includes an optical fiber or a polarization maintaining optical fiber configured to carry the LIDAR output signal to the beam-shaping component 130. The use of the optical link 138 allows the source of the system output signal to be located remote from the LIDAR chip. Although the illustrated optical link 138 is an optical fiber, other optical links 138 can be used. Suitable optical links 138 include, but are not limited to, free space optical links and waveguides. When the LIDAR system excludes an optical link, the one or more beam-shaping components 130 can receive the assembly output signal directly from the LIDAR chip.

Although the LIDAR system of FIG. 1 through FIG. 3A illustrates the splitter as a 2×2 splitter, the splitter can be a 1×2 splitter such as a 1×2 polarization splitter. For instance, the splitter 14 need not output the reference signal on the reference waveguide 28. Accordingly, a reference waveguide 28 need not terminate at the splitter 14. For instance, the light source 10 can include a splitter that taps off a portion of the source output signal to serve as a reference precursor signal. Rather than the polarization rotator 54 receiving the source output signal, the polarization rotator 54 can receive the reference precursor signal and be configured to change the polarization state of the reference precursor signal from the first polarization state to the second polarization state or from the second polarization state to the first polarization state. Light from the output of the polarization rotator 54 can serve as a reference signal that is received by a reference waveguide on the LIDAR chip. The reference waveguide can carry the received reference signal to the processing component 26. The presence of the polarization rotator 54 in the light source 10 provides the reference signals and the comparative signal received by the processing component 26 with the same polarization state.

FIG. 3B illustrates the LIDAR system of FIG. 3A modified to include a 1×2 polarization splitter in place of the 2×2 splitter illustrated in the LIDAR system of FIG. 3A. The light source 10 is modified to include a beam splitter 140 that receives the source output signal from the one or more isolators 52. The beam splitter splits the light source signal into a first portion of the light source signal and a second portion of the reference precursor signal. The first portion of the light source signal serves as the light source signal that is coupled to the input waveguide 11 or the amplifier waveguide 48 on the LIDAR chip. The second portion of the light source signal serves as a reference precursor signal.

The polarization rotator 54 receives the reference precursor signal and outputs a second precursor signal. The polarization rotator 54 is configured to change the polarization state of the reference precursor signal. As a result, when the reference precursor signal has the first polarization state, the second precursor signal has the second polarization state as illustrated in FIG. 3B. Alternately, when the reference precursor signal has the second polarization state, the second precursor signal has the first polarization state.

The second precursor signal is received by a reference waveguide 28 on the LIDAR chip. For instance, the reference waveguide 28 can terminate at a facet 144 and the second precursor signal can enter the reference waveguide 28 through the facet 144. The portion of the second precursor signal that enters the reference waveguide 28 can serve as the reference signal that the reference waveguide 28 carries to the processing component 26 for further processing. As is evident from FIG. 3B, the reference signal and the comparative signal received by the processing component 26 are in the same polarization state.

The light source 10 of FIG. 3B includes a third beam-shaping component 146 that receives the second precursor source signal from the polarization rotator 54. The third beam-shaping component 146 can be configured to provide the source output signal with the desired shape. For instance, the third beam-shaping component 146 can be configured to focus the second precursor signal at a desired location. In one example, the third beam-shaping component 146 is configured to focus the second precursor signal such that the second precursor signal is coupled to the reference waveguide 28. For instance, the third beam-shaping component 146 is configured to focus the second precursor signal at the facet 144 of the reference waveguide 28.

The light source 10 can also include one or more direction changing components such as mirrors or prisms. FIG. 3B illustrates the light source 10 including a mirror 148 as a direction-changing component that redirects the reference precursor signal from the splitter 140 to the polarization rotator 54.

Figure 4A:
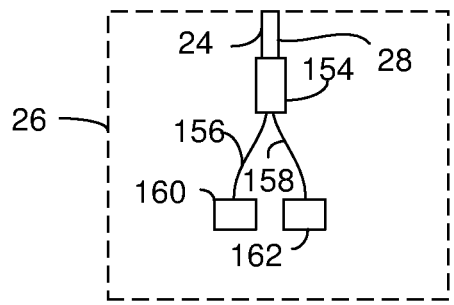
FIG. 4A is a schematic of an example of a suitable processing component for use in a LIDAR system.
Figure 4B:
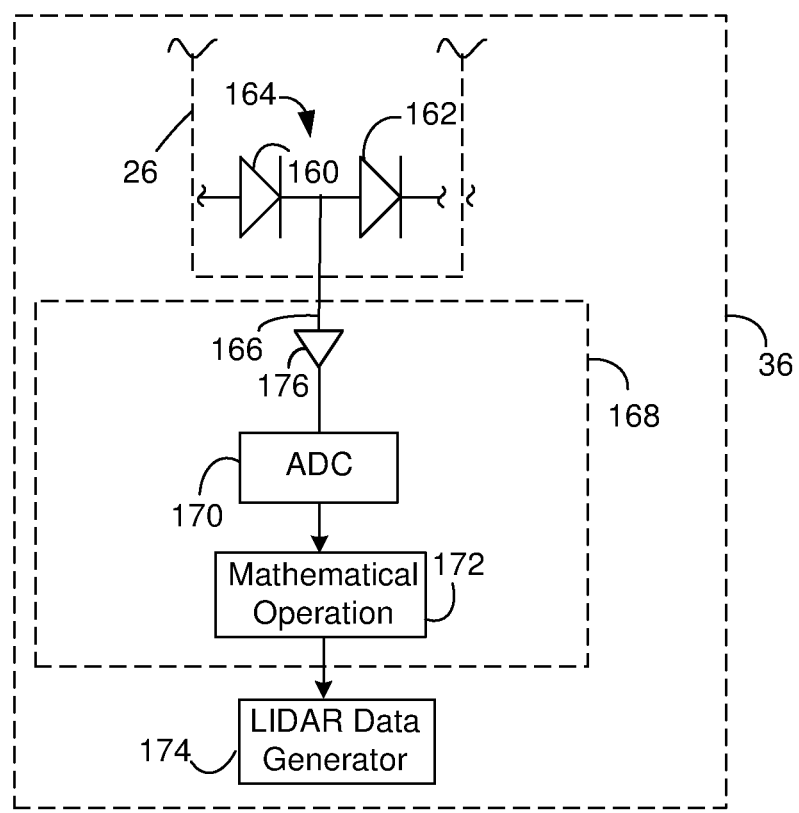
FIG. 4B is a schematic of the relationship between the electronics and the light sensors in a processing.

FIG. 4A through FIG. 4B illustrate an example of a processing component that is suitable for use as the processing component 26 in the above LIDAR systems. The processing component 26 receives the comparative signal from the comparative waveguide 24 disclosed in the context of FIG. 1. The comparative waveguide 24 carries the comparative signal contribution to a light-combining component 154. The processing component 26 receives the reference signal contribution from the reference waveguide 28 disclosed in the context of FIG. 1. The reference waveguide 28 carries the reference signal contribution to the light-combining component 154. The light-combining component 154 combines the comparative signal and the reference signal into a composite signal. As noted above, the reference signal and the comparative signal received by the processing component 26 each includes primarily, consists essentially of, and/or consists of light in the same polarization state. As a result, the light-combining component 154 combines signals of the same polarization state. Due to the difference in frequencies between the comparative signal and the reference signal, the composite signal is beating between the comparative signal and the reference signal.

The light-combining component 154 also splits the resulting composite signal onto a first detector waveguide 156 and a second detector waveguide 158. The first auxiliary detector waveguide 156 carries a first portion of the composite signal to a first light sensor 160 that converts the first portion of the composite signal to a first electrical signal. The second detector waveguide 158 carries a second portion of the composite signal to a second light sensor 162 that converts the second portion of the composite signal to a second electrical signal. Examples of suitable light sensors include germanium photodiodes (PDs), and avalanche photodiodes (APDs).

In some instances, the light-combining component 154 splits the composite signal such that the comparative signal contribution in the included in the first portion of the composite signal is phase shifted by 180° relative to comparative signal contribution in the second portion of the composite signal but the reference signal contribution in the second portion of the composite signal is in-phase with the reference signal contribution in the first portion of the composite signal. Alternately, the light-combining component 154 splits the composite signal such that the reference signal contribution in the first portion of the composite signal is phase shifted by 180° relative to the reference signal contribution in the second portion of the composite signal but the comparative signal contribution in the first portion of the composite signal is in-phase with the portion of the comparative signal in the second portion of the composite signal. Examples of suitable light sensors include germanium photodiodes (PDs), and avalanche photodiodes (APDs).

FIG. 4B provides a schematic of the relationship between the electronics 36 and the light sensors in a processing component 138. The symbol for a photodiode is used to represent the first light sensor 160 and the second light sensor 162, but one or more of these sensors can have other constructions. In some instances, all of the components illustrated in the schematic of FIG. 4B are included on the LIDAR chip. In some instances, the components illustrated in the schematic of FIG. 4B are distributed between the LIDAR chip and electronics located off of the LIDAR chip.

The electronics 36 can connect the first light sensors 160 and the second light sensors 162 as a balanced detector 164. For instance, the electronics can connect the first light sensors 160 in series with the second light sensor 162 as illustrated in FIG. 4B. The serial connection between the first light sensor 160 and the second light sensors 162 carries the output from the balanced detector as a data signal. The data signal can be carried on a sensor output line 166 and can serve as an electrical representation of the composite signals.

The electronics 36 include a transform mechanism 168 configured to perform a mathematical transform on the data signal. The transform mechanism 168 includes an Analog-to-Digital Converter (ADC) 170 that receives the data signal from the sensor output line 166. The Analog-to-Digital Converter (ADC) 170 converts the data signal from an analog form to a digital form and outputs a digital data signal. The digital data signal is a digital representation of the data signal.

The transform mechanism 168 includes a mathematical operation component 172 configured to receive the digital data signal. The mathematical operation component 172 is configured to perform a mathematical operation on the received digital data signal. Examples of suitable mathematical operations include, but are not limited to, mathematical transforms such as Fourier transforms. In one example, the mathematical operation component 172 performs a Fourier transform on the digital signal so as to convert from the time domain to the frequency domain. The mathematical transform can be a real transform such as a real Fast Fourier Transform (FFT). A real Fast Fourier Transform (FFT) can provide an output that indicates magnitude as a function of frequency. As a result, a peak in the output of the Fast Fourier Transform can occur at and/or indicate the correct solution for the beat frequency of the beating signals. The mathematical operation component 172 can execute the attributed functions using firmware, hardware or software or a combination thereof.

The electronics include a LIDAR data generator 174 that receives the output from the transform component 168. The LIDAR data generator 174 can perform a peak find on the output of the transform component 168 to identify the peak in the frequency of the output of the transform component 168. The LIDAR data generator 174 treats the frequency at the identified peak as the beat frequency of the beating signals that each results from all or a portion of a comparative signal beating against all or a portion of a reference signal. The LIDAR data generator 174 can use the identified beat frequencies in combination with the frequency pattern of the LIDAR output signal and/or the system output signal to generate LIDAR data that indicates the radial velocity and/or distance between the LIDAR system and one or more objects located in the sample region.

As shown in FIG. 4B, the sensor output line 166 that carries the data signals can optionally include an amplifier 176. Suitable amplifiers 176 include, but are not limited to, transimpedance amplifiers (TIAs).

Figure 4C:
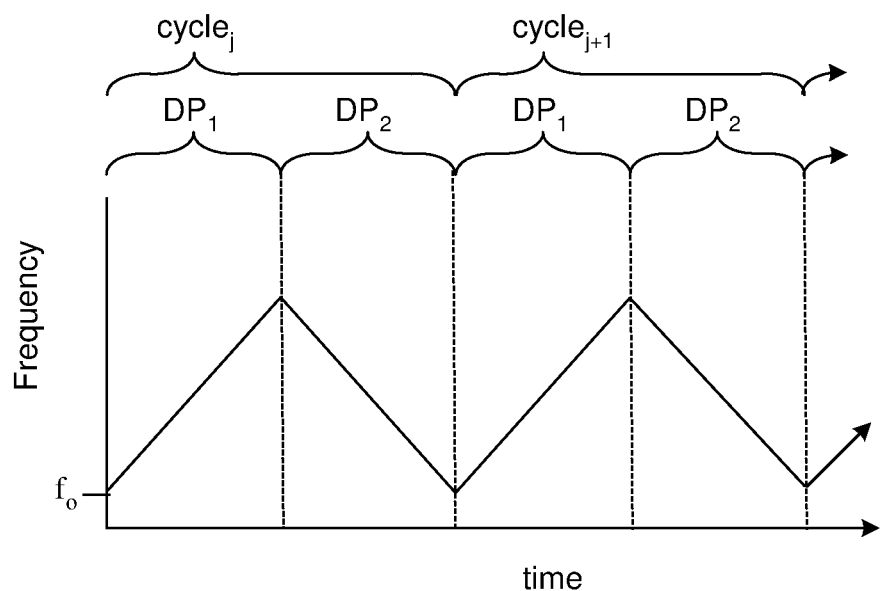
FIG. 4C shows an example of a suitable frequency pattern for the system output signal.

FIG. 4C has a solid line that shows an example of a suitable frequency pattern for the LIDAR output signal and accordingly the system output signal. Accordingly, the solid line also represents the frequency pattern for the reference signal. FIG. 4C shows the frequency versus time pattern over a sequence of two cycles, labeled $cycle_j$ and $cycle_{j+1}$. In some instances, the frequency versus time pattern is repeated in each cycle as shown in FIG. 4C. The illustrated cycles do not include re-location periods and/or re-location periods are not located between cycles. As a result, FIG. 4C illustrates the results for a continuous scan of the system output signal to multiple different sample regions in a field of view.

Each cycle includes K data periods that are each associated with a period index k and are labeled $DP_k$. In the example of FIG. 4C, each cycle includes two data periods (with k=1 and 2). In some instances, the frequency versus time pattern is the same for the data periods that correspond to each other in different cycles as is shown in FIG. 4C. Corresponding data periods are data periods with the same period index. As a result, each data period $DP_1$ can be considered corresponding data periods for that same channel index (i) and the associated frequency versus time patterns are the same in FIG. 4C. At the end of a cycle, the electronics return the frequency to the same frequency level at which it started the previous cycle.

During each data period, the frequency of the system output signal is varied at a constant rate. The rate can be zero but at least a portion of the data periods in each cycle have the system output signal varied at a non-zero rate. The direction and/or rate of the frequency change changes at the change of data periods from the same cycle. For instance, during the data period $DP_1$ and the data period $DP_2$, the electronics operate the light source such that the frequency of the system output signal changes at a linear rate a. The direction of the frequency change during the data period $DP_1$ is the opposite of the direction of the frequency change during the data period $DP_2$.

The beat frequencies ($f_{LDP}$) from two or more different data periods in the same cycle can be combined to generate the LIDAR data. For instance, the beat frequency determined from $DP_1$ in FIG. 4C can be combined with the beat frequency determined from $DP_2$ in FIG. 4C to determine the LIDAR data for a sample region. As an example, the following equation applies during a data period where electronics increase the frequency of the outgoing LIDAR signal during the data period such as occurs in data period $DP_1$ of FIG. 4C: $f_{ub}=-f_d+\alpha\tau$ where $f_{ub}$ is the beat frequency determined from the output of the mathematical operation component 172, $f_d$ represents the Doppler shift ($f_d=2\ vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ of FIG. 4C: $f_{db}=-f_d-\alpha\tau$ where $f_d$ is the beat frequency determined from the output of the mathematical operation component 172. In these two equations, $f_d$ and $\tau$ are unknowns. The electronics solve these two equations for the two unknowns. The radial velocity for the sample region then be determined from the Doppler shift ($v=c*f_d/(2f_c)$) and/or the separation distance for that sample region can be determined from $c*\tau/2$. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

Figure 5:
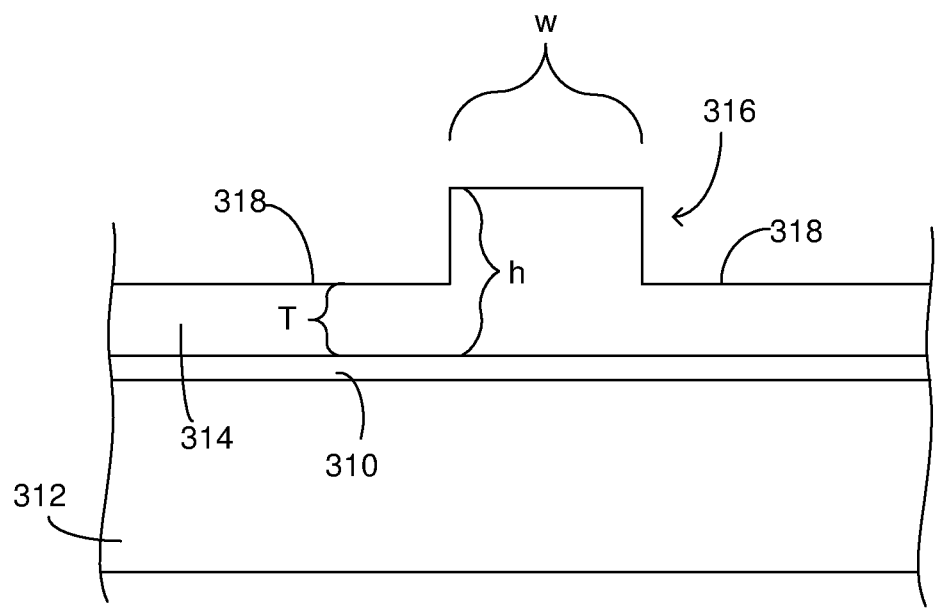
FIG. 5 is a cross-section of a portion of a LIDAR chip that includes a waveguide on a silicon-on-insulator platform.

Suitable platforms for the LIDAR chips include, but are not limited to, silica, indium phosphide, and silicon-on-insulator wafers. FIG. 5 is a cross-section of a portion of a chip constructed from a silicon-on-insulator wafer. A silicon-on-insulator (SOI) wafer includes a buried layer 310 between a substrate 312 and a light-transmitting medium 314. In a silicon-on-insulator wafer, the buried layer 310 is silica while the substrate 312 and the light-transmitting medium 314 are silicon. The substrate 312 of an optical platform such as an SOI wafer can serve as the base for the entire LIDAR chip. For instance, the optical components shown on the LIDAR chips of FIG. 1 through FIG. 2 can be positioned on or over the top and/or lateral sides of the substrate 312.

FIG. 5 is a cross section of a portion of a LIDAR chip that includes a waveguide construction that is suitable for use in LIDAR chips constructed from silicon-on-insulator wafers. A ridge 316 of the light-transmitting medium extends away from slab regions 318 of the light-transmitting medium. The light signals are constrained between the top of the ridge 316 and the buried oxide layer 310.

The dimensions of the ridge waveguide are labeled in FIG. 5. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5

µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 5 is suitable for all or a portion of the waveguides on LIDAR chips constructed according to FIG. 1 through FIG. 2.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the first light sensor and the second light sensor.

When the LIDAR chip includes one or more amplifiers, one or more amplifiers can be integrated onto the platform of the LIDAR chip. For instance, one or more amplifiers can be integrated onto a LIDAR chip constructed on a silicon-on-insulator wafer. An example of an amplifier construction that can be integrated onto a silicon-on-insulator wafer can be found in U.S. patent application Ser. No. 13/317,340, filed on Oct. 14 2011, entitled Gain Medium Providing Laser and Amplifier Functionality to Optical Devices, and incorporated herein in its entirety.

Figure 6A:
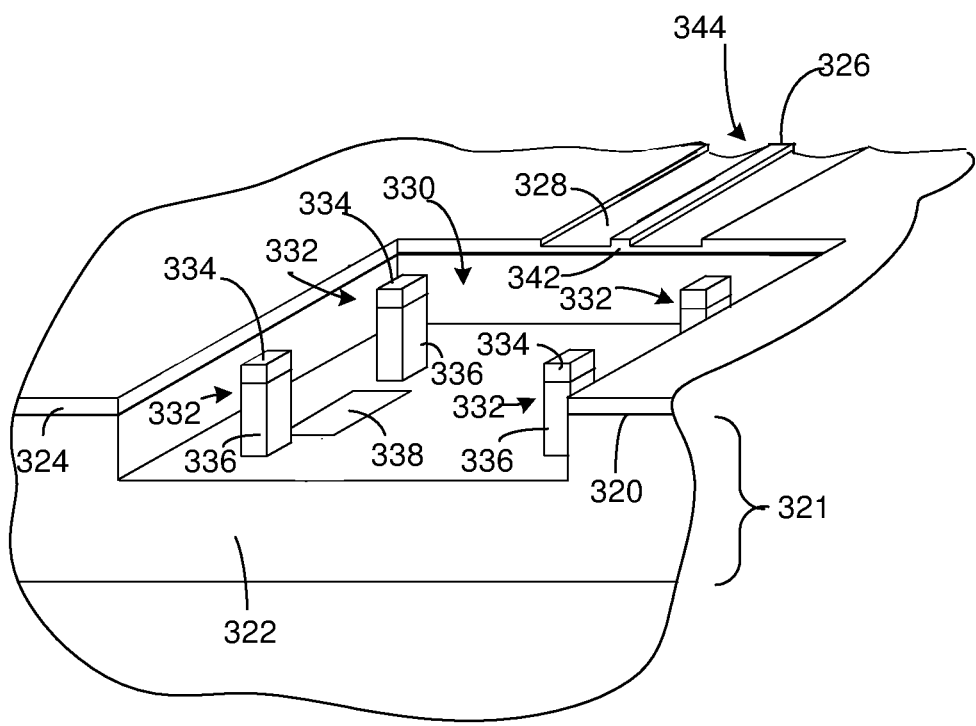
FIG. 6A is a perspective view of a portion of a LIDAR chip that includes an interface for optically coupling the LIDAR chip with an amplifier.

FIG. 6A is a perspective view of a portion of a LIDAR chip that includes an interface for optically coupling the LIDAR chip with an amplifier chip. The illustrated portion of the LIDAR chip includes a stop recess 330 sized to receive the amplifier. The stop recess 330 extends through the light-transmitting medium 324 and into the base 321. In the illustrated version, the stop recess 330 extends through the light-transmitting medium 324, the buried layer 320, and into the substrate 322.

A facet 342 of the light-transmitting medium 324 serves as a lateral side of the stop recess 30. The facet 342 can be a facet of a waveguide 344 depending on the application of the amplifier. For instance, the facet 342 can be a facet of a source waveguide when the amplifier is used as disclosed in the context of FIG. 1 or a facet of a utility waveguide when the amplifier is used as disclosed in the context of FIG. 8. Although not shown, the facet 342 can include an anti-reflective coating. A suitable anti-reflective coating includes, but is not limited to, single-layer coatings such as silicon nitride or aluminum oxide, or multi-layer coatings, which may contain silicon nitride, aluminum oxide, and/or silica.

One or more stops 332 extend upward from a bottom of the stop recess 330. For instance, FIG. 6A illustrates four stops 332 extending upward from the bottom of the stop recess 330. The stops 332 include a cladding 334 positioned on a base portion 336. The substrate 322 can serve as the base portion 336 of the stops 332 and the stop 332 can exclude the buried layer 320. The portion of the substrate 322 included in the stops 332 can extend from the bottom of the stop recess 330 up to the level of the buried layer 320. For instance, the stops 332 can be formed by etching through the buried layer 320 and using the underlying substrate 322 as an etch-stop. As a result, the location of the top of the base portion 336 relative to the optical mode of a light signal in the waveguide 384 is well known because the buried layer 320 defines the bottom of the second waveguide and the top of the base portion 336 is located immediately below the buried layer 320. The cladding 334 can be formed on base portion 336 of the stops 332 so as to provide the stops 332 with a height that will provide the desired alignment between the waveguide 384 and an amplifier waveguide on an amplifier chip.

Attachment pads 338 are positioned on the bottom of the stop recess 330. The attachment pads 338 can be used to immobilize the amplifier chip relative to the LIDAR chip once the amplifier chip is positioned on the LIDAR chip. In some instances, the attachment pads 338 also provide electrical communication between the LIDAR chip and one or more amplifiers on an amplifier chip. Suitable attachment pads 338 include, but are not limited to, solder pads.

Figure 6B:
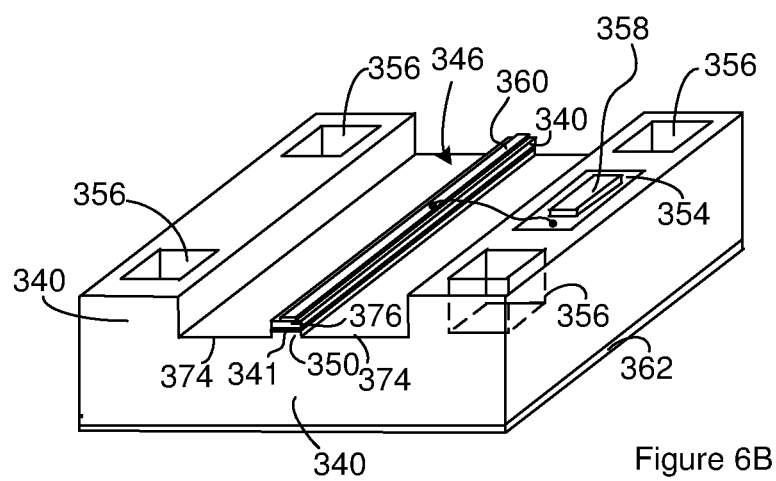
FIG. 6B is a perspective view of an amplifier chip suitable for use with the portion of the LIDAR chip shown in FIG. 6A.

FIG. 6B is a perspective view of one embodiment of an amplifier chip. The illustrated amplifier chip is within the class of devices known as planar optical devices. The amplifier chip includes an amplifier waveguide 346 defined in a gain medium 340. Suitable gain media include, but are not limited to, InP, InGaAsP, and GaAs.

Trenches 374 extending into the gain medium 340 define a ridge 376 in the gain medium 340. The ridge 376 defines the amplifier waveguide 346. In some instances, the gain medium 340 includes one or more layers 341 in the ridge and/or extending across the ridge 376. The one or more layers 341 can be positioned between different regions of the gain medium 340. The region of the gain medium 340 above the one or more layers 341 can be the same as or different from the region of the gain medium 340 below the one or more layers 341. The layers can be selected to constrain light signals guided through the amplifier waveguide 346 to a particular location relative to the ridge 376. Each of the layers 341 can have a different composition of a material that includes or consists of two or more components of selected from a group consisting of In, P, Ga, and As. In one example, the gain medium 340 is InP and the one or more layers 341 each includes Ga and As in different ratios.

The amplifier waveguide 346 provides an optical pathway between a first facet 350 and the second facet 352. Although not shown, the first facet 350 and/or the second facet 352 can optionally include an anti-reflective coating. A suitable anti-reflective coating includes, but is not limited to, single-layer coatings such as silicon nitride or aluminum oxide, or multi-layer coatings that may contain silicon nitride, aluminum oxide, and/or silica.

The amplifier chip includes one or more attachment pads 354 that can be employed to immobilize the amplifier chip relative to the LIDAR chip. Suitable attachment pads 354 include, but are not limited to, solder pads.

The amplifier chip includes a first conductor 360 on the ridge and a second conductor 362 that is both under the gain medium and under the ridge 376. The first conductor 360 is in electrical communication with an attachment pad 354. Suitable methods for providing electrical communication between the first conductor 360 and the attachment pad 354 include, but are not limited to, conducting metal traces.

The amplifier chip also includes one or more alignment recesses 356. The dashed lines in FIG. 6B show the depth and shape of one of the alignment recesses 356.

Figure 6C:
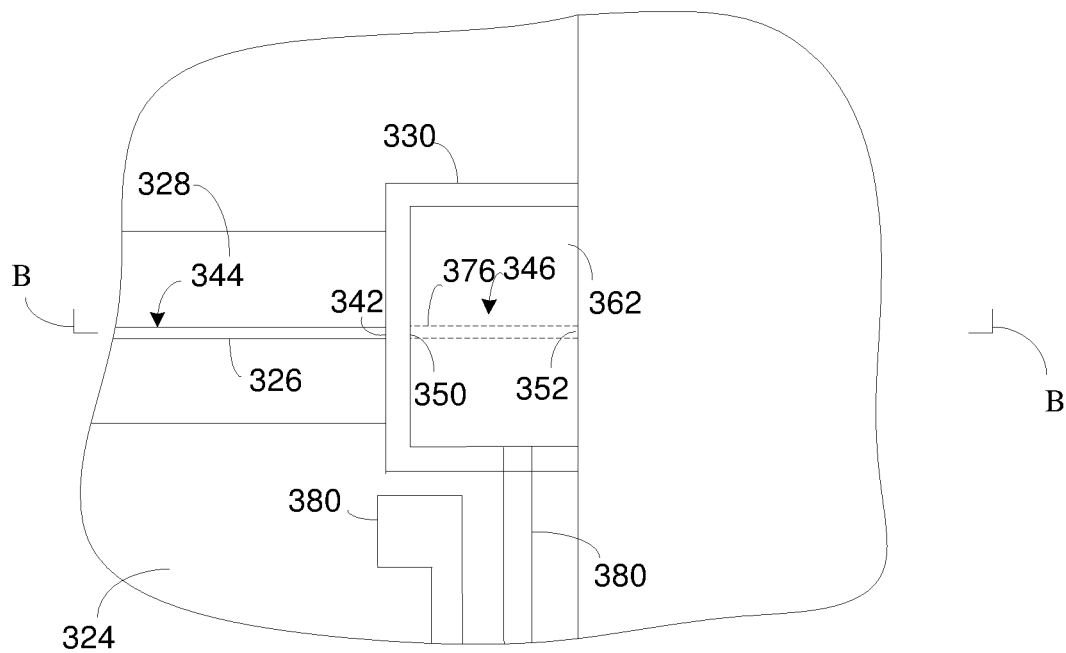
FIG. 6C and FIG. 6D illustrate system that includes the LIDAR chip of FIG. 6A interfaced with the amplifier of FIG. 6B.
Figure 6D:
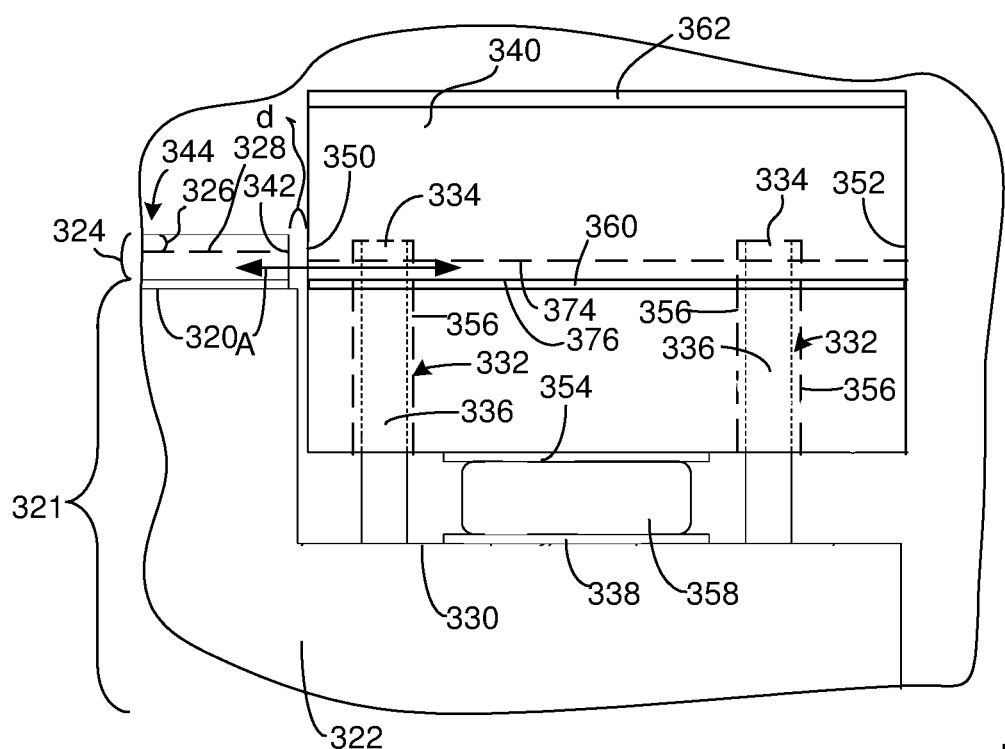

FIG. 6C and FIG. 6D illustrates the LIDAR chip of FIG. 6A interfaced with the amplifier chip of FIG. 6B. FIG. 6C is a topview of the LIDAR system. FIG. 6D is a sideview of a cross section of the system taken through the waveguide 384 on the LIDAR chip and an amplifier waveguide 346 on the amplifier chip. For instance, the cross section of FIG. 6D can be taken a long a line extending through the brackets labeled B in FIG. 6C. FIG. 6C and FIG. 6D each includes dashed lines that illustrate features that are located behind other features in the system. For instance, FIG. 6C includes dashed lines showing the ridge 376 of the amplifier waveguide 346 even though the ridge 376 is located under the gain medium 340. Additionally, FIG. 6D includes dashed lines that illustrate the locations of the portion of the stops 332 and alignment recesses 356 located behind the ridge 376 of the amplifier waveguide 346. FIG. 6D also includes dashed lines that illustrate the location where the ridge 326 of waveguide 384 interfaces with the slab regions 328 that define the waveguide 384 also dashed lines that illustrate the location where the ridge 376 of the amplifier waveguide 346 interfaces with slab regions 374 of the amplifier chip.

The amplifier chip is positioned in the stop recess 330 on the LIDAR chip. The amplifier chip is positioned such that the ridge 376 of the amplifier waveguide 346 is located between the bottom of the amplifier chip and the base 321 of the LIDAR chip. Accordingly, the amplifier chip is inverted in the stop recess 330. Solder or other adhesive 358 contacts the attachment pads 338 on the bottom of the stop recess 330 and the attachment pads 354 on the amplifier chip. For instance, the solder or other adhesive 358 extends from an attachment pad 338 on the bottom of the stop recess 330 to an attachment pad 354 on the auxiliary device. Accordingly, the solder or other adhesive 358 immobilizes the auxiliary device relative to the LIDAR chip.

The facet 342 of the waveguide 384 is aligned with the first facet 350 of the amplifier waveguide 346 such that the waveguide 384 and the amplifier waveguide 346 can exchange light signals. As shown by the line labeled A, the system provides a horizontal transition path in that the direction that light signals travel between the LIDAR chip and the amplifier chip is parallel or is substantially parallel relative to an upper and/or lower surface of the base 321. A top of the first facet 350 of the amplifier waveguide 346 is at a level that is below the top of the facet 342 of the utility waveguide.

The one or more stops 332 on the LIDAR chip are each received within one of the alignment recesses 356 on the auxiliary device. The top of each stop 332 contacts the bottom of the alignment recess 356. As a result, the interaction between stops 332 and the bottom of the alignment recesses 356 prevent additional movement of the amplifier chip toward the LIDAR chip. In some instances, the auxiliary device rests on top of the stops 332.

As is evident from FIG. 6D, the first facet 350 of the amplifier waveguide 346 is vertically aligned with the facet 342 of the waveguide 384 on the LIDAR chip. As is evident from FIG. 6C, the first facet 350 of the amplifier waveguide 346 is horizontally aligned with the facet 342 of the waveguide 384 on the LIDAR chip. The horizontal alignment can be achieved by alignment of marks and/or features on the amplifier chip and the LIDAR chip.

The vertical alignment can be achieved by controlling the height of the stops 332 on the LIDAR chip. For instance, the cladding 334 on the base portion 336 of the stops 332 can be grown to the height that places the first facet 350 of the amplifier waveguide 346 at a particular height relative to the facet 342 of the waveguide 384 on the LIDAR chip. The desired cladding 334 thickness can be accurately achieved by using deposition techniques such as evaporation, plasma enhanced chemical vapor deposition (PECVD), and/or sputtering to deposit the one or more cladding layers. As a result, one or more cladding layers can be deposited on the base portion 336 of the stops 332 so as to form the stops 332 to a height that provides the desired vertical alignment. Suitable materials for layers of the cladding 334 include, but are not limited to, silica, silicon nitride, and polymers.

In FIG. 6D, the first facet 350 is spaced apart from the facet 342 by a distance labeled D. Since the amplifier waveguide is optically aligned with only one waveguide, the first facet 350 can be closer to the facet 342 than was possible with prior configurations. For instance, the distance between the first facet 350 and the facet 342 can be less than 5 µm, 3 µm, or 1 µm and/or greater than 0.0 µm. In FIG. 1D, the atmosphere in which the LIDAR chip is positioned is located in the gap between the first facet 350 and the facet 342; however, other gap materials can be positioned in the gap. For instance, a solid gap material can be positioned in the gap. Examples of suitable gap materials include, but are not limited to, epoxies and polymers.

The LIDAR chip includes electrical pathways 380 on the light-transmitting medium 324. The electrical pathways 380 can optically include contact pads and can be in electrical communication with the electronics. Although not illustrated, one of the electrical pathways 380 can be in electrical communication with the contact pad 354. Since the contact pad 354 is in electrical communication with the first conductor 360, the contact pad 354 provides electrical communication between the first conductor 360 and the electronics. Another one of the electrical pathways 380 can be in electrical communication with the second conductor 362. Suitable methods for providing electrical communication between the second conductor 362 and the electrical pathway 380 include, but are not limited to, wire bonding. Suitable electrical pathways 380 include, but are not limited to, metal traces.

The electronics can use the electrical pathways 380 to apply electrical energy to the portion of the amplifier between the first conductor 360 and the second conductor 362. The electronics can apply the electrical energy so as to drive an electrical current through the amplifier waveguide 346. The electrical current through the gain medium provides the amplification of light signals guided in the amplifier waveguide 346.

Figure 7:
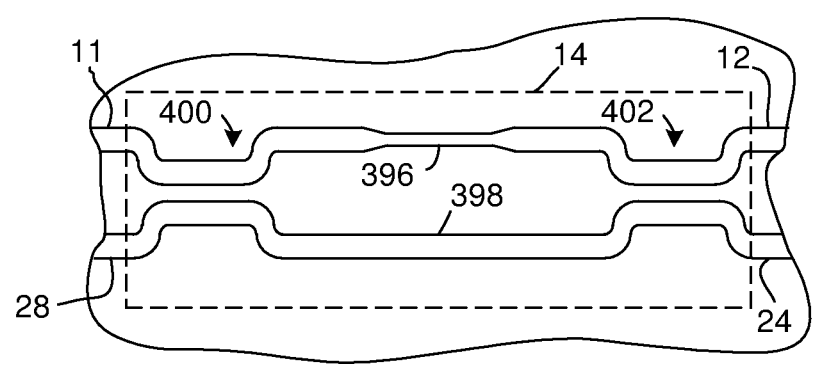
FIG. 7 is a topview of a polarizing beam-splitter suitable for use with the LIDAR chip of FIG. 1.

The polarization splitter can be a separate component that is attached to the silicon-on-insulator platform or can be integrated with the silicon-on-insulator platform. Examples of polarization splitters that can be used with a silicon-oninsulator platform include, but are not limited to, Mach-Zehnder Interferometers, and zero-order Arrayed Waveguide Gratings (AWGs). FIG. 7 is a topview of a Mach-Zehnder interferometer that is modified to serve as a polarization splitter 14 that can be integrated with the silicon-on-insulator platform. The splitter includes a first branch waveguide 396 and a second branch waveguide 398 between a first optical coupler 400 and a second optical coupler 402. The input waveguide 11 and the reference waveguide 28 converge at the first optical coupler 400. Additionally, the utility waveguide 12 and comparative waveguide 24 converge at a second optical coupler 402. The input waveguide carries the input signal to the first optical coupler 400. The first optical coupler 400 divides the input signal into a first input signal that is output on the first branch waveguide 396 and a second input signal that is output on the second branch waveguide 398. The second optical coupler 402 combines the first input signal and the second input signal. The first branch waveguide 396 and the second branch waveguide 398 can have different lengths such that there is a phase differential between the first input signal and the second input signal at the second optical coupler 402. Additionally, the first branch waveguide 396 and the second branch waveguide 398 have different birefringence levels. As a result of the phase differential and the birefringence differential, the second optical coupler 402 outputs the portion of the combined signal that is in the first polarization state is output on the utility waveguide 12 and the portion of the combined signal that is in the second polarization state is output on the comparative waveguide 24. Additionally, the second optical coupler 402 divides the incoming LIDAR signal into a first incoming LIDAR signal that is output on the first branch waveguide 396 and a second incoming LIDAR signal that is output on the second branch waveguide 398. The first optical coupler 400 combines the incoming LIDAR signal and the second incoming LIDAR signal. As a result of the phase differential and the birefringence differential, the first optical coupler 400 outputs the portion of the combined signal that is in the second polarization state on the reference waveguide 28. Additionally, the first optical coupler 400 outputs any of the combined signal that is in the first polarization state on the input waveguide 11.

One way to provide the birefringence differential is to provide the first branch waveguide 396 and the second branch waveguide 398 with different cross sectional dimensions for all or a portion of their length where the cross section is taken transverse or perpendicular to the longitudinal axis of the waveguide. For instance, FIG. 7 shows a portion of the first branch waveguide 396 as having a smaller width than the corresponding portion of the second branch waveguide 398. The reduced width provides the first branch waveguide 396 with a different birefringence than the second branch waveguide 398. In some instances, the first branch waveguide 396 and the second branch waveguide 398 are constructed such that the first branch waveguide 396 has a birefringence that is within the birefringence of the second branch waveguide 398+/−1%, +/−5%, or +/−10%.

The first branch waveguide 396 and the second branch waveguide 398 can be constructed as disclosed in the context of FIG. 5.

Suitable electronics can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the light source 10 is illustrated as being located on the LIDAR chip, the light source can be located off the LIDAR chip. For instance, the LIDAR chip can receive the outgoing LIDAR signal from an optical fiber.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:
a LIDAR system includes a polarizing-beam splitter configured to receive an input light signal from an input waveguide and output an outgoing LIDAR signal on a utility waveguide,
the outgoing LIDAR signal including light from the input signal,
the LIDAR system being configured to output a system output signal that includes light from the outgoing LIDAR signal, the system output signal can be reflected by an object located outside of the LIDAR system such that a reflected portion of the system output signal serves as a system return signal; and
the polarizing-beam splitter configured to receive an incoming LIDAR signal from the utility waveguide,
the incoming LIDAR signal including light from the system return signal,
the polarizing-beam splitter outputting at least a portion of the incoming LIDAR signal on a comparative waveguide, and
the polarizing-beam splitter being configured to output a first portion of the input signal on the utility waveguide as the outgoing LIDAR signal and to output a second portion of the input signal on a reference waveguide as a reference signal.

2. The system of claim 1, wherein the utility waveguide is configured to guide the outgoing LIDAR signal and the incoming LIDAR signal in opposing directions.

3. The system of claim 1, wherein the outgoing LIDAR signal is primarily in a first polarization state and the incoming LIDAR signal is primarily in a second polarization state, the first polarization state being different from the second polarization state.

4. The system of claim 1, wherein the outgoing LIDAR signal is primarily in a first polarization state and the reference signal is primarily in a second polarization state, the first polarization state being different from the second polarization state.

5. The system of claim 4, wherein the incoming LIDAR signal is primarily in the second polarization state.

6. The system of claim 1, wherein the at least the portion of the incoming LIDAR signal on the comparative waveguide serves as a comparative signal, and the LIDAR chip is configured to generate a composite signal having light from the reference signal beating with light from the comparative signal.

7. The system of claim 1, wherein the reference signal consists of light that has not exited from the LIDAR chip.

8. The system of claim 6, wherein the light from the reference signal that is beating with the light from the comparative signal is in the same polarization state as the light from the comparative signal that is beating with the light from the reference signal.

9. The system of claim 8, wherein the comparative signal does not include light from the reference signal.

10. The system of claim 6, further comprising:
electronics configured to use a beat frequency of the composite signal in a determination of LIDAR data that indicates a distance and/or radial velocity between the LIDAR system and the object.

11. The system of claim 1, wherein the LIDAR chip includes a silicon-on-insulator platform.

12. The system of claim 1, wherein the polarizing-beam splitter is a Mach-Zehnder interferometer.

13. The system of claim 12, wherein the interferometer includes multiple branch waveguides that carry light signals between optical couplers and different branch waveguides have different levels of birefringence.

14. A LIDAR system, comprising:
a LIDAR chip with a utility waveguide configured to guide an outgoing LIDAR signal and an incoming LIDAR signal,
the incoming LIDAR signal including light from the LIDAR output signal after an object located outside of the LIDAR system reflects the light from the LIDAR output signal;
the LIDAR chip including a polarizing-beam splitter configured to couple a portion of the outgoing LIDAR signal from the utility waveguide onto a reference waveguide as a reference signal and to couple a portion of the incoming LIDAR signal from the utility waveguide onto a comparative waveguide as a comparative signal;
the LIDAR chip configured to generate a composite signal having light from the reference signal beating with light from the comparative signal; and
electronics configured to use a beat frequency of the composite signal as a variable in a calculation of LIDAR data that indicates a distance and/or radial velocity between the LIDAR system and the object.

15. The system of claim 14, wherein the utility waveguide is configured to guide the outgoing LIDAR signal and the incoming LIDAR signal in opposing directions.

16. The system of claim 14, wherein the outgoing LIDAR signal is primarily in a first polarization state and the incoming LIDAR signal is primarily in a second polarization state, the first polarization state being different from the second polarization state.

17. The system of claim 14, wherein the outgoing LIDAR signal is primarily in a first polarization state and the reference signal is primarily in a second polarization state, the first polarization state being different from the second polarization state.

18. The system of claim 14, wherein the light from the reference signal that is beating with the light from the comparative signal is in the same polarization state as the light that is from the comparative signal and is beating with the light from the reference signal.

\* \* \* \* \*